(No Model.)
W. A. BARRINGTON.
COFFEE POT.
No. 453,535. Patented June 2, 1891.
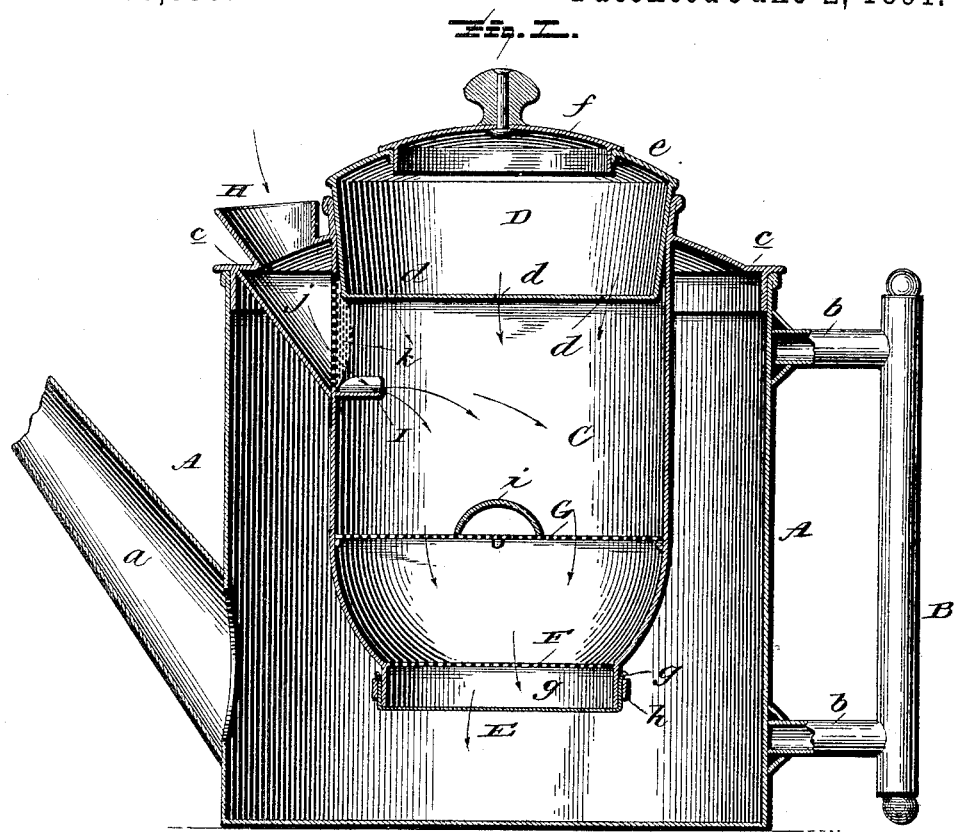
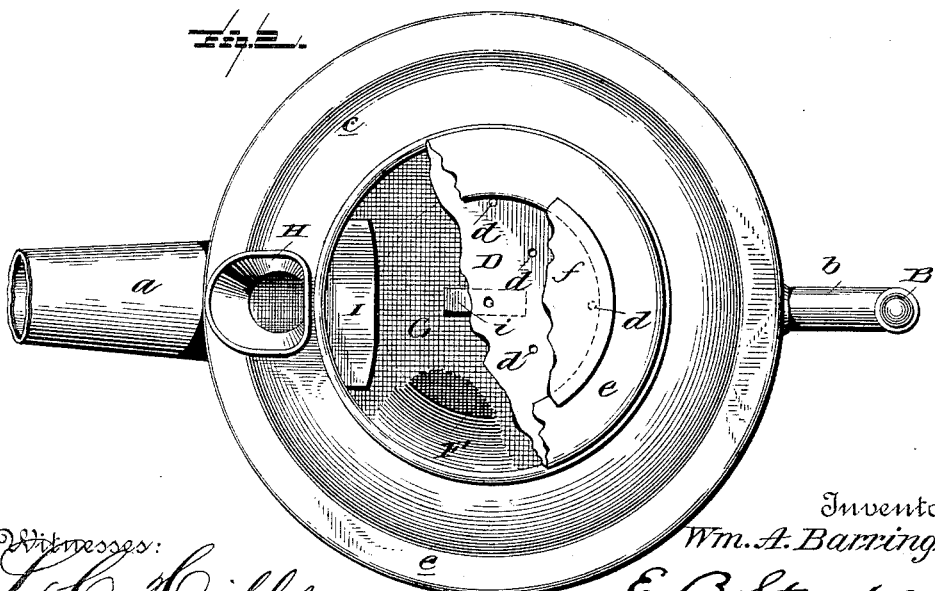
Witnesses:
L. C. Hills
E. H. Bond
Inventor:
Wm. A. Barrington,
E. B. Stocking,
Attorney

UNITED STATES PATENT OFFICE.

WILLIAM A. BARRINGTON, OF LOUISVILLE, KENTUCKY.

COFFEE-POT.

SPECIFICATION forming part of Letters Patent No. 453,535, dated June 2, 1891.

Application filed January 7, 1891. Serial No. 377,021. (No model.)

*To all whom it may concern:*

Be it known that I, WILLIAM A. BARRINGTON, a citizen of the United States, residing at Louisville, in the county of Jefferson, State of Kentucky, have invented certain new and useful Improvements in Coffee-Pots, of which the following is a specification, reference being had therein to the accompanying drawings.

This invention relates to certain new and useful improvements in apparatus for preparing coffee or tea; and it has for its objects, among others, to provide an improved device of this character which shall be cheap of manufacture, easily cleaned, and by the use of which coffee or tea may be made in the shortest possible time.

The apparatus consists of a dripper, a condenser fitted into the top thereof and provided with small apertures in its bottom to allow the cold water therein to slowly trickle through and aid in condensing all the steam and aroma of the coffee that would otherwise escape, and strainers so arranged as to effectually strain the coffee during its treatment, thereby making it clear and free from dregs or sediment. I provide the dripper with a contracted bottom to permit of the ready making of small quantities of coffee and also to lessen the size of the cloth strainer therein. I provide a hot-water filler having a deflector to cause the hot water to be thrown toward the center of the dripper, the boss formed upon the exterior of the said dripper by this hot-water filler serving as a connection between the lid and the body of the dripper and preventing the spilling of the coffee in the act of pouring it out.

Other objects and advantages of the invention will hereinafter appear, and the novel features thereof will be specifically defined by the appended claims.

The invention is clearly illustrated in the accompanying drawings, which, with the letters of reference marked thereon, form a part of this specification, and in which—

Figure 1 is a central vertical section through my improved coffee-pot with the handle in side view, with portions broken away. Fig. 2 is a top view thereof with portions broken away.

Like letters of reference indicate like parts in both views.

Referring now to the details of the drawings by letter, A designates the body of the coffee or tea pot, which may be of any well-known shape and form of construction, being provided with a discharge-spout $a$ and handle B, the latter being shown as connected with the body by horizontal portions $b$, which are preferably hollow, as shown.

C is the dripper, which is a substantially cylindrical vessel provided with a surrounding flange $c$ at the upper end, which serves as a lid to the coffee-pot, as seen in Fig. 1.

D is the condensing-chamber, which is adapted to fit within the upper end of the dripper, as seen in Fig. 1, and in its bottom I provide a plurality of small holes $d$, through which the cold water which is designed to be contained within the condenser is allowed to slowly trickle to aid in the condensing of the steam. This condenser is provided with a top $e$, which is provided centrally with an aperture closed by a removable cover $f$, provided with a suitable knob or handle, as seen in Fig. 1. The portion of the top of the condenser surrounding the aperture therein serves as a shield to prevent the water within the said chamber from running out when the coffee-pot is tilted in pouring the coffee. The lower end of the dripper is contracted and provided with a vertical portion $g$, around which is secured in any suitable manner—as, for instance, by a band or ring $h$—a cloth strainer E of fine mesh. At the junction of this vertical portion with the body of the dripper I arrange an interior strainer F of slightly larger mesh than the strainer E, as seen in Fig. 1. This strainer may be held in place in any suitable manner. Above the strainer F, within the dripper, is arranged still another strainer G, which is supported in position in any suitable manner and preferably provided with a suitable bail or handle $i$, by which it may be readily removed or inserted in place when desired.

H is the filling-spout, which surrounds an opening in the top of the dripper, as seen in Fig. 1, and this communicates with a hot-water chamber or channel $j$, which extends exteriorly of the dripper, having an inwardly-inclined wall, which joins to the outer wall of the dripper, as seen in Fig. 1, the inner wall of this chamber being perforated, as seen at $k$.

Within the dripper, at a point substantially at the bottom of the hot-water chamber, I place a spreader-plate I, which serves to spread the water and throw it toward the middle of the dripper.

The operation will be readily understood. The ground coffee is placed in the dripper on top of strainer F and the strainer G placed in position on top of the grounds, as shown, and then the condensing-chamber placed in position and filled with cold water, and its cover then placed in position. Sufficient hot water is then poured into the hot-water chamber through its spout, and it is thrown by the spreader toward the center of the dripper and through the strainer G onto the coffee, and the same is ready for immediate use.

Various modifications in details of construction may be resorted to without departing from the spirit of the invention or sacrificing any of its advantages. One of the strainers may be dispensed with, if desired. The ground coffee being held in between the strainers F and G, the strainer F supporting it and the strainer G serving to spread the water evenly over it, the grounds are prevented from slopping upon the sides of the pot.

What I claim as new is—

1. The combination, with a suitable vessel, as A, of the dripper having filling-spout independent of the condensing-chamber, and the condensing-chamber fitted within the dripper and provided with perforations, substantially as and for the purpose specified.

2. The combination, with the vessel A, of the dripper having a flange serving as a lid to said vessel, a filling-spout independent of the condensing-chamber and hot-water chamber, and a condensing-chamber fitted within the upper end of the dripper and provided with perforated bottom, substantially as specified.

3. The combination, with the vessel, of the dripper having filling-spout independent of the condensing-chamber and hot-water chamber, and a spreader arranged beneath the condensing-chamber in the path of the water through said spout, as set forth.

4. The combination, with the vessel A, of the dripper, the strainers therein, the condensing-chamber fitted within the upper end of the dripper, the filling-spout to one side and independent of the condensing-chamber, and the spreader within the dripper independent of and beneath the condensing-chamber, as set forth.

5. A dripper for the purpose described, provided with a surrounding flange at its upper end, a filling-spout, and an exterior projecting hot-water vessel communicating with said spout and with the interior of the dripper and having an interior spreader, as set forth.

6. The combination, with the vessel A, of the dripper having flange at its upper end, and a condensing-chamber fitted within the dripper and having top provided with removable cover, the said dripper being provided with hot-water filling-spout and chamber extending upon the outside of the dripper and connecting the body thereof with the said flange and provided with inclined wall, substantially as and for the purpose specified.

In testimony whereof I affix my signature in presence of witnesses.

WILLIAM A. BARRINGTON.

Witnesses:
FRANK B. FELLOWS,
H. SUTHERLAND,
JOHN L. BROWN.